No. 634,767. Patented Oct. 10, 1899.
J. D. ROSS.
VOLT AND AMPERE METER.
(Application filed Feb. 18, 1899.)
(No Model.)
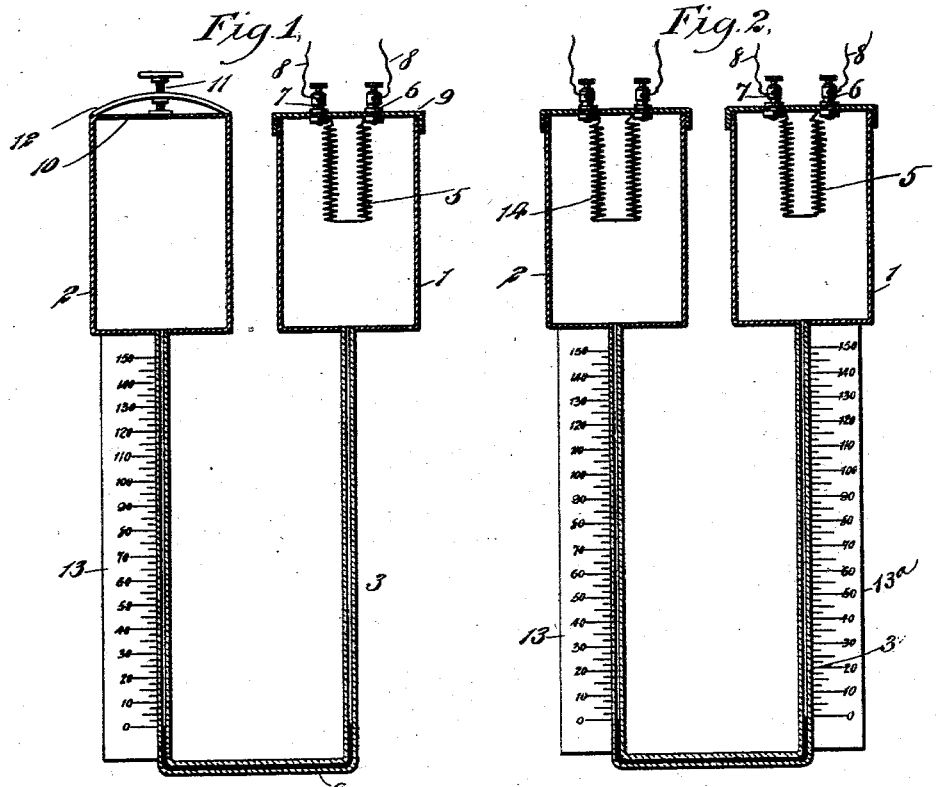
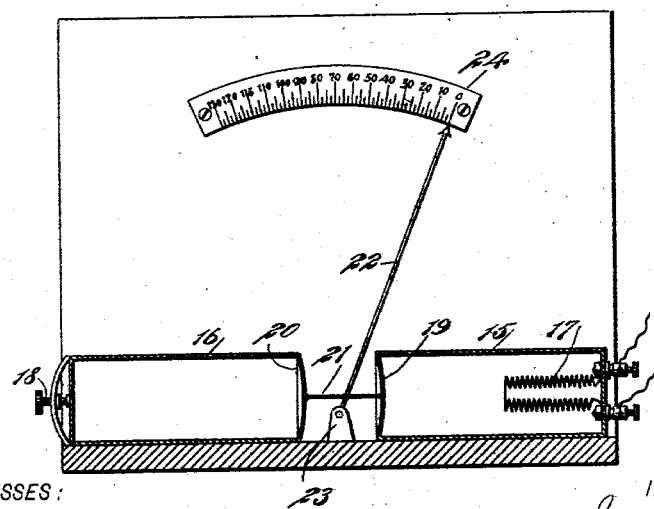
WITNESSES:
Edward Thorpe
C. R. Ferguson
INVENTOR
James D. Ross.
BY
ATTORNEYS.

UNITED STATES PATENT OFFICE.

JAMES D. ROSS, OF VICTORIA, CANADA.

VOLT AND AMPERE METER.

SPECIFICATION forming part of Letters Patent No. 634,767, dated October 10, 1899.

Application filed February 18, 1899. Serial No. 706,003. (No model.)

*To all whom it may concern:*

Be it known that I, JAMES D. ROSS, of Victoria, in the Province of British Columbia and Dominion of Canada, have invented a new and Improved Volt and Ampere Meter, of which the following is a full, clear, and exact description.

This invention relates to improvements in volt and ampere meters; and the object is to provide a meter of simple and comparatively inexpensive construction, not liable to get out of order, and not affected by heat or atmospheric changes.

I will describe a volt and ampere meter embodying my invention, and then point out the novel features in the appended claims.

Reference is to be had to the accompanying drawings, forming a part of this specification, in which similar characters of reference indicate corresponding parts in all the figures.

Figure 1 is a sectional elevation of a meter embodying my improvement. Fig. 2 is a sectional elevation showing a modification, and Fig. 3 is a section showing another modification.

Referring first to the example of my improvement shown in Fig. 1, 1 2 designate two casings or shells forming air-chambers. These casings or shells have equal air-containing capacity, and they are connected one with the other by means of a capillary tube 3, having vertically-disposed members and a cross-connection at the bottom, and in this tube is arranged a liquid column 4, consisting of spirits of mercury. Extended into one of the cylinders or shells (here shown as cylinder or shell 1) is a resistance-coil 5, which has its terminals in connection with binding-posts 6 and 7, so that it practically forms a continuation of the conductor 8, connected to the binding-posts. In order that the resistance 5 may be removed to be replaced by one of greater or less resistance, I attach it to a removable cover 9 on the cylinder or casing 1. As before stated, the two cylinders or casings must have an equal containing capacity, so that in a normal condition or when no current is flowing through the resistance 5, the pressure will be equalized in the two cylinders or casings. In order to provide for a minute adjustment or equalization of the pressure, I provide the cylinder or casing 2 with a flexible top 10, which is engaged by an adjusting-screw 11, having a screw-thread engagement in a yoke 12.

On the branch of the pipe 3 which leads into the cylinder or casing 2 or adjacent to said branch is a scale 13, marked in electrical units or their fractions. The resistance 5 is of a coarseness depending upon the relative sizes of the cylinders or casings and the tube and the current to be measured. It is connected across mains or in the circuit according as it is used as a voltmeter or amperemeter, and it may carry all the current or be used in shunt, as desired. In operation if a current traverses the resistance 5 it heats the air confined in the cylinder or casing 1 and the expansion of said air forces the liquid column 4 upward in the branch of the tube connecting with the cylinder or casing 2, and the greater the current the greater the heat and consequent expansion, so that the upper end of the column will indicate on the scale the pressure or the current, as the case may be.

In the example of my improvement shown in Fig. 2 the construction is similar to that above described in connection with Fig. 1, excepting that in the cylinder or casing 2 a resistance or conductor 14 is also placed. This arrangement of the device may be employed for making comparisons between two currents of electricity. In this example a scale 13ª is arranged adjacent to the section of the tube 3, connecting with the shell or casing 1, so that by noting the height of the mercury column on the two scales the difference of intensity of the two currents may be observed.

In the example of my improvement shown in Fig. 3 there are two shells or casings 15 16, which, like the shells or casings first described, are air-tight and of equal internal capacity. In one of the shells or casings (here shown as the shell or casing 15) is the conductor or resistance 17, and the outer end of the shell or casing 16 is made flexible and is engaged by a screw 18 for the purpose of equalizing the pressure in the two cylinders or chambers. The inner or adjacent ends of the two cylinders or casings 15 and 16 are movable inward and outward relatively to the shells or casings. As here shown, the adjacent ends of the shells or casings 15 and 16 are made in the form of flexible disks or diaphragms 19 and 20, and they are connected at the center by a rod 21.

In the first example of my improvement I have shown the indicator as consisting of a liquid column. In this instance, however, the indicator consists of a pointer 22, having swinging connection with the rod 21 and having pivotal connection with a fixed stud 23. The end of this indicator 22 is movable over a scale 24, marked with the electrical units.

Obviously the operation of the device shown in Fig. 3 will be substantially the same as before described—that is, the increase of pressure caused by a current flowing through the conductor 17 will operate the adjacent movable ends of the cylinders or casings against the air-resistance in the cylinder or casing 16, and consequently moving the indicator or pointer 20 along the scale.

Having thus fully described my invention, I claim as new and desire to secure by Letters Patent—

1. In an electric meter, two air-tight cylinders, a capillary tube connecting the two cylinders, a liquid in said tube, a gage having fixed relation with the tube, and means for electrically equalizing or varying the pressure in the two cylinders, substantially as specified.

2. An electric meter, comprising two cylinders or casings having equal containing capacity means for equalizing the initial pressure in the casings, and an indicator operated by variations of pressure in the two casings controlled by an electric current, substantially as specified.

3. An electric meter, comprising two air-tight cylinders or casings having equal containing capacity, means for regulating the initial pressure in the casings, a resistance arranged in one of the cylinders or casings and adapted for connection with an electric conductor, and an indicator controlled by the variations of pressure caused by the passing of a current through the resistance in one of the cylinders or casings, substantially as specified.

4. An electric meter, comprising two cylinders or casings of equal internal capacity connected by a tube containing a liquid column, means for equalizing the initial pressure in the casings and an electric conductor extended into one of the cylinders or casings, substantially as specified.

5. An electric meter, comprising two air-tight cylinders or casings of equal internal capacity, means for equalizing the initial pressure in the two cylinders, a tube connecting the two cylinders or casings and containing a liquid, a scale, and a resistance extended into one of the cylinders or casings and adapted for connection with an electric conductor, substantially as specified.

6. In an electric meter, two air-tight cylinders of equal interior capacity, a capillary tube connecting the two cylinders, a liquid in said tube, a conductor arranged in one of the cylinders, and means for equalizing the initial pressure in the two cylinders, substantially as specified.

JAMES D. ROSS.

Witnesses:
EDWIN A. BRADLEY,
GEORGE N. GOWEN.